United States Patent
Pinnow et al.

[11] Patent Number: 5,880,434
[45] Date of Patent: Mar. 9, 1999

[54] FOOD TREATMENT CABINET

[75] Inventors: Curtis Pinnow, Libertyville; Robert Fortmann, Mundelein, both of Ill.; Charles Hunckler, Monticello, Ind.; Lawrence Banovez, Kenosha, Wis.

[73] Assignee: Restaurant Technology, Inc., Oak Brook, Ill.

[21] Appl. No.: 561,438

[22] Filed: Nov. 21, 1995

[51] Int. Cl.⁶ .................................................. H05B 1/02
[52] U.S. Cl. ........................... 219/386; 219/385; 219/395; 219/391; 99/483
[58] Field of Search .................................. 219/391, 395, 219/394, 406, 407, 386, 385, 396; 392/416; 373/119, 127, 130; 99/483

[56] References Cited

U.S. PATENT DOCUMENTS

| | | |
|---|---|---|
| 1,292,658 | 1/1919 | Smith . |
| 1,638,041 | 8/1927 | Korkames . |
| 1,814,942 | 7/1931 | Mabey . |
| 2,108,778 | 2/1938 | Morgan ..................... 219/19 |
| 2,283,182 | 5/1942 | Carl ............................ 219/35 |
| 2,860,225 | 11/1958 | Steen ......................... 219/35 |
| 3,261,343 | 7/1966 | Tibell . |
| 3,313,917 | 4/1967 | Ditzler et al. ............. 219/400 |
| 3,632,968 | 1/1972 | Wilson ...................... 219/214 |
| 3,674,982 | 7/1972 | Hoyt et al. ................ 219/403 |
| 3,897,989 | 8/1975 | Grandi ..................... 312/236 |
| 3,908,749 | 9/1975 | Williams ....................... 165/2 |
| 3,924,100 | 12/1975 | Mack et al. ............. 219/386 |
| 3,965,969 | 6/1976 | Williamson ............ 165/267 |
| 4,019,022 | 4/1977 | Seider et al. ............ 219/386 |
| 4,020,310 | 4/1977 | Souder, Jr. et al. .... 219/10.49 |
| 4,068,115 | 1/1978 | Mack et al. ............. 219/386 |
| 4,093,041 | 6/1978 | Davis et al. ............... 186/45 |
| 4,103,736 | 8/1978 | Colato et al. ........... 165/48.1 |
| 4,110,587 | 8/1978 | Souder, Jr. et al. .... 219/10.49 |
| 4,180,125 | 12/1979 | Schulz et al. ........... 165/48.1 |
| 4,194,109 | 3/1980 | Springer ................... 219/386 |
| 4,210,675 | 7/1980 | Liebermann ............ 426/233 |
| 4,224,862 | 9/1980 | Liebermann ............... 99/331 |
| 4,235,282 | 11/1980 | de Fillippis et al. ...... 165/61 |
| 4,254,824 | 3/1981 | Springer ..................... 165/64 |
| 4,278,697 | 7/1981 | Liebermann ............ 426/506 |
| 4,346,756 | 8/1982 | Dodd et al. ................ 165/48 |
| 4,446,780 | 5/1984 | Puvogel et al. ........... 99/480 |
| 4,580,035 | 4/1986 | Lüscher ............... 219/395 X |

(List continued on next page.)

OTHER PUBLICATIONS

Wells Models DABC–IPS and DABC–ITL Equipment Manual, Apr., 1989, pp. 1–7.
Henny Penny Model HC–934DA Equipment Manual, Apr., 1995, pp. 1–6.
Carter–Hoffmann Models MD–110TL and MD–110PS Equipment Manual, Aug., 1994, pp. 1–8.
KES Dual Access Bun Staging Cabinet 6FH05.

*Primary Examiner*—Peter S. Wong
*Assistant Examiner*—K. Shin
*Attorney, Agent, or Firm*—Ryndak & Lyerla

[57] ABSTRACT

A food treatment cabinet having a frame/housing defining a food treatment space. First structure is provided for at least one of heating, cooling, and adding moisture to air within the food treatment space. The frame/housing has a first wall with a first opening therethrough to selectively permit introduction of food into the food treatment space and withdrawal of food from the food treatment space. A first fin projects away from the first wall above at least part of the first opening to inhibit heat transfer between the food treatment space and the atmosphere externally of the food treatment space.

20 Claims, 3 Drawing Sheets

U.S. PATENT DOCUMENTS

| | | | |
|---|---|---|---|
| 4,584,466 | 4/1986 | de Mola | 219/386 |
| 4,757,184 | 7/1988 | Swanson et al. | 219/400 |
| 4,784,054 | 11/1988 | Karos et al. | 99/483 |
| 4,951,648 | 8/1990 | Shukla et al. | 126/21 A |
| 5,028,761 | 7/1991 | Oda et al. | 219/386 |
| 5,069,273 | 12/1991 | O'Hearne | 165/206 |
| 5,077,065 | 12/1991 | Ash et al. | 426/231 |
| 5,086,693 | 2/1992 | Tippmann et al. | 99/333 |
| 5,093,556 | 3/1992 | Oelfke | 219/386 |
| 5,172,328 | 12/1992 | Cahlander et al. | 364/478 |
| 5,182,438 | 1/1993 | Oakes et al. | 219/386 |
| 5,189,281 | 2/1993 | Wyatt et al. | 219/386 |
| 5,201,364 | 4/1993 | Tippmann et al. | 165/26 |
| 5,203,258 | 4/1993 | Tippmann et al. | 99/483 |
| 5,206,045 | 4/1993 | Stuck | 426/243 |
| 5,355,869 | 10/1994 | Pickard et al. | 126/263.01 |
| 5,396,046 | 3/1995 | Oelfke | 219/386 |
| 5,403,997 | 4/1995 | Wimpee et al. | 219/386 |
| 5,404,935 | 4/1995 | Liebermann | 165/48.1 |

5,880,434

FOOD TREATMENT CABINET

BACKGROUND OF THE INVENTION

1. Field of the Invention

This invention relates to cabinets for storing prepared food items and, more particularly, to a cabinet defining a food treatment space within which temperature and/or humidity can be controlled.

2. Background Art

It is the goal of most fast food operators to prepare, and have on hand, food in volumes high enough to promptly accommodate customers during the highest demand hours, yet to minimize waste. These objectives are inherently in competition with each other.

The volume of customers frequenting restaurants cannot be predicted with any certainty. While increase in the volume of customers at peak hours can be anticipated, the volume during these peak hours may vary dramatically from one day to the next, for no apparent reason. For example, large groups often are bussed into fast food restaurants, thereby imposing a severe demand on the food preparers.

To anticipate these unusual demands, fast food owners may keep on hand relatively large quantities of prepared food. A substantial amount of waste inevitably periodically occurs.

The problem of food waste has been significantly diminished by the development of holding cabinets which maintain prepared foods in a cooked and ready-to-eat state for substantial time periods. The assignee herein has made numerous developments in this technology, among which are those described in U.S. Pat. Nos. 4,835,368 and 4,891,498. These units have been highly commercially successful and have demonstrated an ability to maintain the temperature, appearance, taste, texture and aroma of precooked foods for unusually long periods of time.

In each of the systems in the above two patents, a single "environment" with predetermined humidity and temperature parameters is maintained. The units have been provided with an access door which allows introduction of foods into, and removal of foods from, the food treatment space within the cabinet. Certain of these units are equipped with electronic controls to reestablish the desired environment after the doors open and the environment is disturbed.

Food treatment systems which require the development and/or introduction of steam into the food treatment space have some inherent problems. In certain geographic regions the available water supply may have a high chemical content which may corrode even the most expensive and durable metals used in these systems.

These chemicals also tend to accumulate in conduits through which the water is conveyed, oft times detrimentally diminishing the capacity of these conduits and potentially causing a complete blockage thereof. No matter how well a system such as this is designed, these problems cannot be completely avoided.

Another problem with this conventional type cabinet with a single environment is that the access opening to the food treatment space must remain closed to maintain the environment. Users of this type of cabinet are required to open the door each time access to the food treatment space is required, to load and unload foods. Aside from the inconvenience of the food servers having to open the door, the repetitive use of the door may ultimately lead to failure of the hinge and/or latching structure therefor. In some food chains, the assignee herein has determined through its studies that annual repetitions of opening and closing of such closure doors may exceed 1 million. Regardless of how high the quality of the hinge and latch structures is, they are unlikely to withstand such use without some compromise of performance.

Eliminating the door would solve the problems associated with convenience and wear. However, an unobstructed opening in communication with the food treatment space would allow equalization of the humidity and temperature with the outside environment. The only way to avoid this condition with existing systems would be to introduce large quantities of heat and humidity within the food treatment space. Energy requirements for such a system would be prohibitive.

It is known to heat vertically spaced shelves to concentrate heat on foods, as shown in U.S. Pat. No. 4,093,041, to Davis et al. However, the incorporation of the closure doors described therein is a recognition by Davis et al that a closure is necessary to avoid excessive heat loss.

SUMMARY OF THE INVENTION

In one form of the invention, a food treatment cabinet is provided having a frame/housing defining a food treatment space. First structure is provided for at least one of heating, cooling, and adding moisture to air within the food treatment space. The frame/housing has a first wall with a first opening therethrough to selectively permit introduction of food into the food treatment space and withdrawal of food from the food treatment space. A first fin projects away from the first wall above at least part of the first opening to inhibit heat transfer between the food treatment space and the atmosphere externally of the food treatment space.

In one form, the fin projects away from the first frame/housing wall between one and four inches and has a thickness in a vertical direction that is on the order of 1½–2½ inches. The fin may be made from plastic material, such as that sold under the trademark DELRIN™.

In one form, the first frame/housing opening has a width and the first fin extends across substantially the entire width of the first frame/housing opening.

The cabinet may be constructed with no cover on the frame/housing that blocks the first frame/housing opening so that the first frame/housing opening at all times defines an unobstructed path to the food treatment space.

In one form, the frame/housing defines a first, downwardly facing surface and a second, upwardly facing surface bounding a first subspace within the food treatment space. The first structure, previously mentioned, at least one of heats and cools one, and preferably each, of the first and second surfaces.

The invention also contemplates a container for food in combination with the food treatment cabinet. The container is repositionable relative to the frame/housing selectively between a first position wherein food in the container is situated in the food treatment space between the first and second surfaces and a second position wherein the container is situated so that food can be placed in and removed from the container without interference from the first and second surfaces.

The container may have a bottom wall with a peripheral wall extending upwardly from the bottom wall, terminating at an upper edge, and defining in conjunction with the bottom wall a cup-shaped configuration. In one form, the first surface on the housing/frame resides no more than one inch above the upper edge of the peripheral wall of the container with the container in the first position.

The upper edge of the container may reside substantially within a plane. The first surface on the frame/housing may be planar. With the container in the first position, the first surface of the frame/housing is substantially parallel to the plane of the upper edge of the container.

The upper edge of the container is preferably spaced no more than ½ inch from the first surface of the frame/housing with the container in the first position. In another, more preferable form, this spacing is on the order of 1/16 inch.

The container may be provided with a plurality of compartments therein. With the container in the second position, one of the plurality of compartments resides between the first and second frame/housing surfaces and another of the plurality of compartments does not reside between the first and second frame/housing surfaces.

In another form of the invention, the frame/housing defines a third, downwardly facing surface and a fourth, upwardly facing surface bounding a second subspace within the food treatment space. The first structure at least one of heats and cools one, and preferably each, of the third and fourth surfaces.

The first and second subspaces may be vertically spaced from each other, with there being a second opening in the first frame/housing wall and a second fin projecting away from the first wall above at least a part of the second opening.

The first opening may reside at least partially between the first and second fins, with at least one of the first and second fins preferably having a surface for guiding the container into the first position within the food treatment space.

The guiding surface may be at approximately the same height as the second frame/housing surface.

At least one of the first and second fins may have a ramp portion thereon that guides the container into the first subspace.

The frame/housing may have a second wall with a third opening therethrough so that an uninterrupted passage is defined from the first opening through the food treatment space and out the third opening.

A second fin may be provided on the second wall above at least a part of the third opening.

DETAILED DESCRIPTION OF THE DRAWINGS

Figure 1:
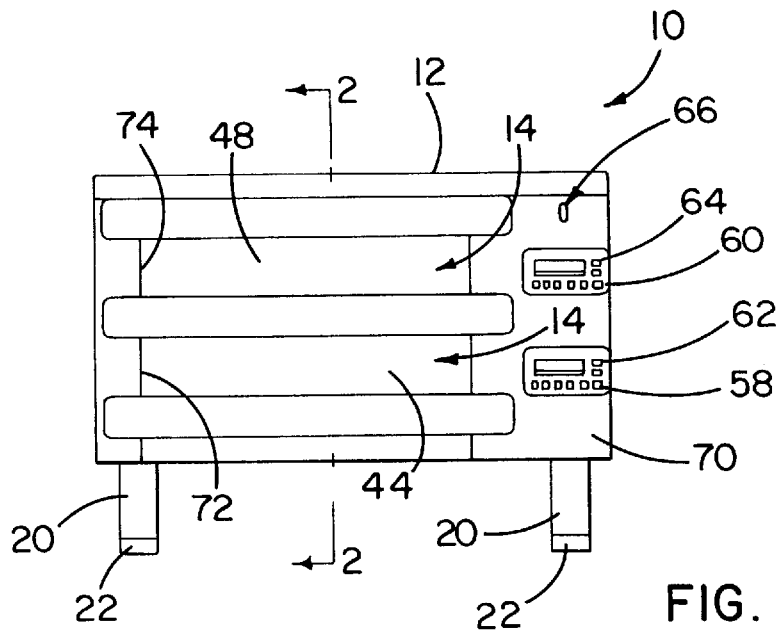
FIG. 1 is a front elevation view of a food treatment cabinet according to the present invention.
Figure 2:
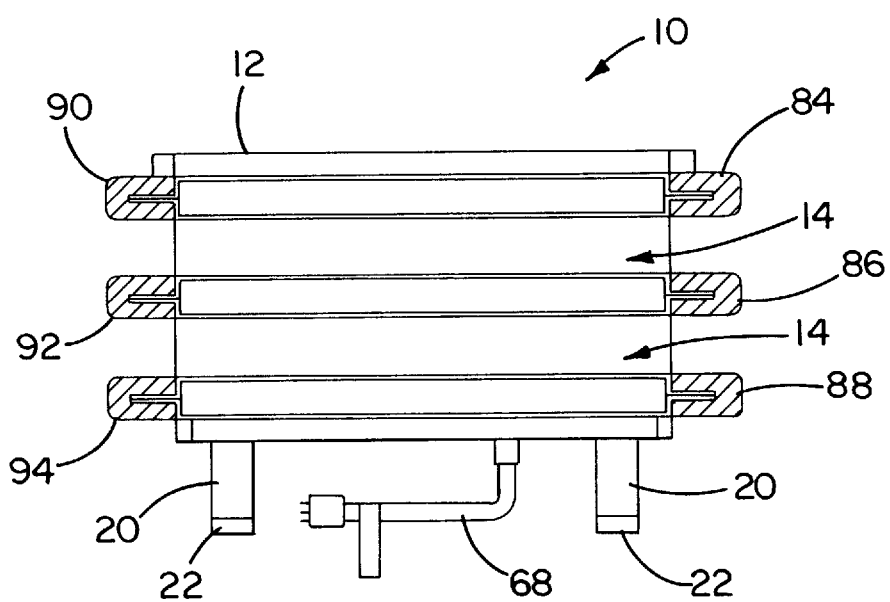
FIG. 2 is a cross-sectional view of the inventive food treatment cabinet taken along line 2—2 of FIG. 1.
Figure 3:
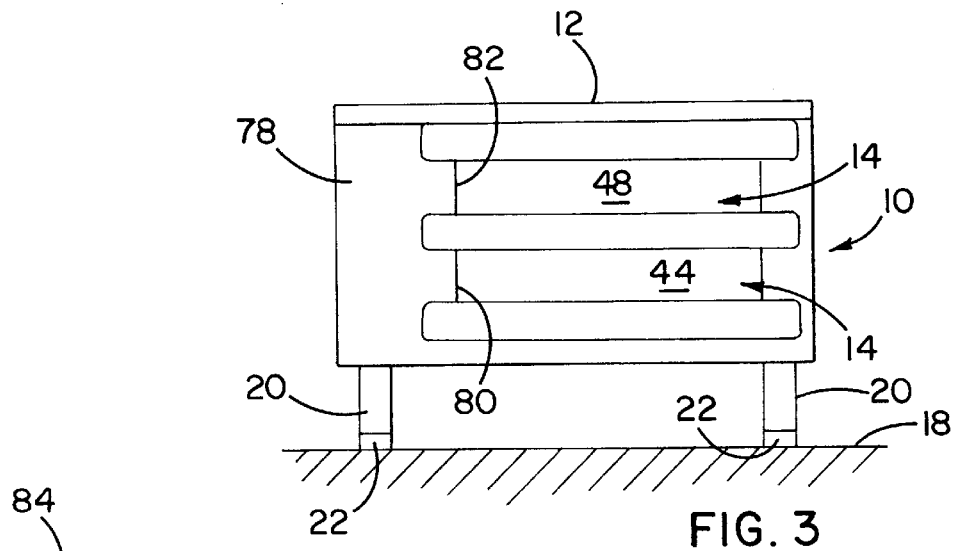
FIG. 3 is a rear elevation view of the inventive cabinet.
Figure 4:
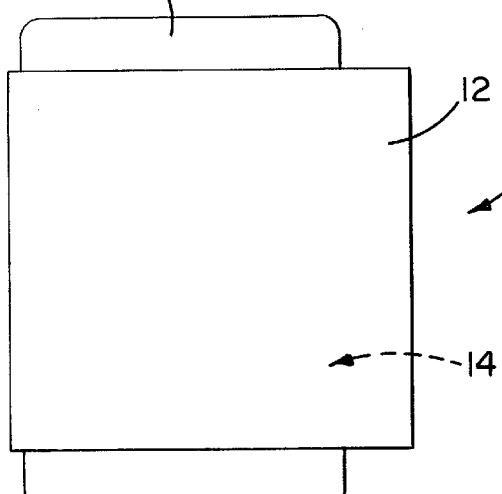
FIG. 4 is a plan view of the inventive cabinet.
Figure 6:
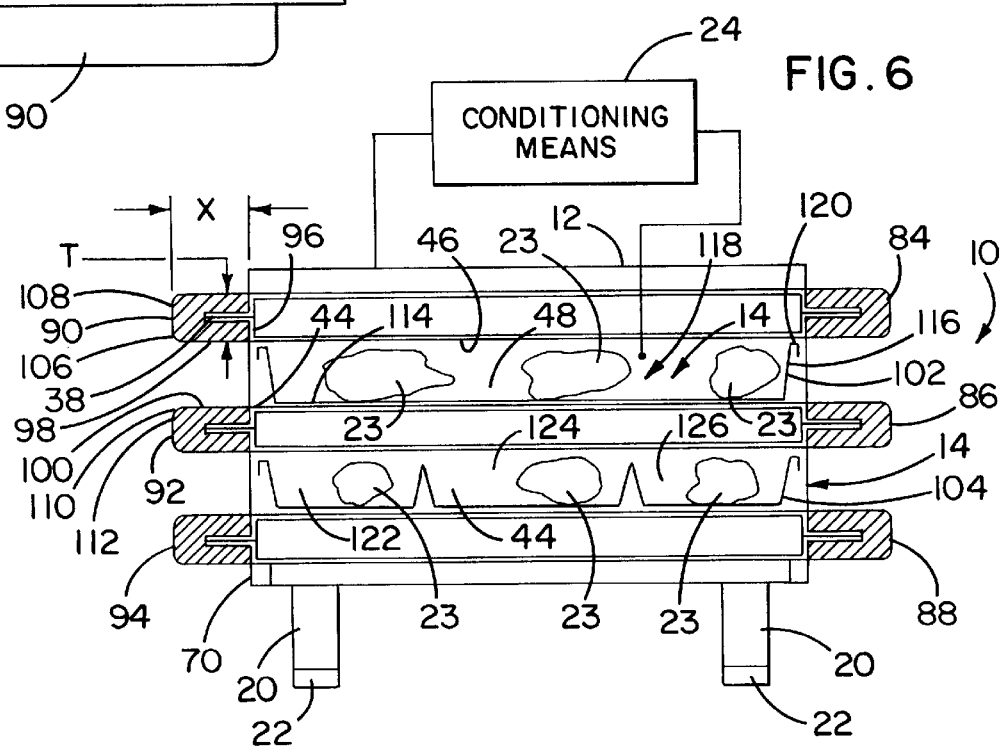
FIG. 6 is a cross-sectional view of the inventive cabinet, as in FIGS. 2 and 5, and showing two different types of containers with discrete food items therein.
Figure 5:
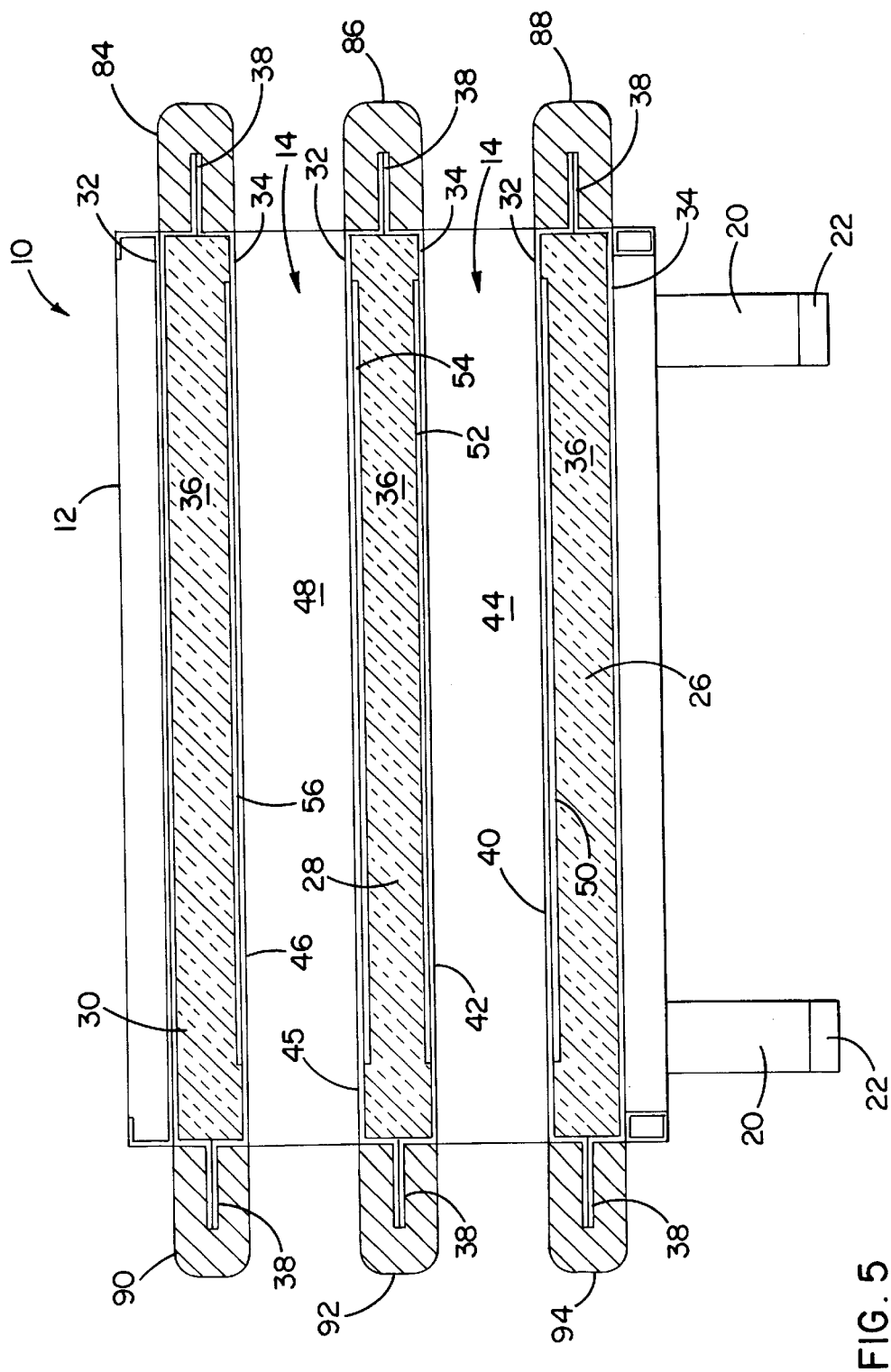
FIG. 5 is an enlarged, cross-sectional view of the inventive cabinet, similar to that in FIG. 2, and showing the location of heaters for a food treatment space.

A food treatment cabinet, according to the present invention, is shown at 10 in FIGS. 1–6. The food treatment cabinet 10 has a frame/housing 12 defining an internal, food treatment space 14. The frame/housing 12 is supported in an elevated position above a subjacent surface 18 by a plurality of legs 20 having surface engaging suction cups 22 at the bottom thereof.

Within the food treatment space 14, individual food items 23 are subjected to conditioned air. The conditioning of the air within the space 14 is accomplished by a means, shown schematically at 24 in FIG. 6. The conditioning means 24 may be such as to heat, cool, and/or introduce humidity into the space 14. In a preferred form, the conditioning means 24 heats the space 14, as described below.

The frame/housing 12 has an overall squared shape with an overall width and depth on the order of 21 inches and a height on the order of 12 inches. The frame/housing 12 defines a bottom shelf 26, a top shelf 28, and a ceiling 30. Each of the shelves 26, 28 and ceiling 30 is defined by formed, stainless steel plates 32, 34 joined to produce a hollow core 36 and integral, cantilevered flanges 38 at the front and rear of the frame/housing 12. The core 36 is filled with fiberglass insulation to inhibit heat conduction therethrough.

The bottom shelf 26 has an upwardly facing, substantially flat surface 40 which, in conjunction with a flat, downwardly facing surface 42 on the top shelf 28, bounds a subspace 44. The top shelf 28 has an upwardly facing surface 45 which cooperates with a downwardly facing surface 46, on the ceiling 30, to bound a second subspace 48.

A conventional silicone heater 50 is attached to the bottom shelf 26 to conduct heat through the surface 40 thereon. Similar heaters 52, 54 are attached to the top shelf 28 to conduct heat through the surfaces 42, 45, respectively. A silicone heater 56 is attached to the ceiling 30 to conduct heat through the surface 46.

The temperature within the subspaces 44, 48, as determined by the heaters 50, 52, 54, 56, is set through controls 58, 60 having exposed operating panels 62, 64, respectively accessible from the front of the cabinet 10. The controller 58 controls the heaters 50, 52, while the controller 60 controls the heaters 54, 56. An on/off switch 66 is also provided at the front of the cabinet 10. Power to each of the heaters 50, 52, 54, 56 is supplied from a power source through a cord 68.

The frame/housing 12 has a front wall 70 with vertically spaced openings 72, 74 therethrough establishing an unimpeded access path to the subspaces 44, 48. In an exemplary unit, each opening has a height of 2.562 inches and a width of 21.062 inches. The rear wall 78 of the frame/housing 12 has corresponding and aligned, vertically spaced openings 80, 82 therethrough to provide access to the subspaces 44, 48 from the rear of the cabinet 10. Through this arrangement, an unimpeded path is defined through the front opening 72, the subspace 44, and rear opening 80. A similar unobstructed path is defined through the front opening 74, the subspace 48, and the rear opening 82.

Ideally, there are no doors or other obstructions to the introduction of food items 23 into the subspaces 44, 48. This permits the operator to introduce and remove food items 23 with one hand and also avoids repair and replacement of door hinges and latches as is inevitable with a heavily used cabinet.

The inventors herein found unexpectedly that the temperature within the subspaces 44, 48 can be maintained effectively without the need for doors, or other types of closure, by incorporating fins 84, 86, 88 at the rear of the cabinet 10 and like fins 90, 92, 94 at the front of the cabinet 10, as described below. Representative fins 90, 92, 94 will be described, with the fins 84, 86, 88 functioning in the same manner at the rear of the cabinet 10.

Each of the fins 90, 92, 94 has a similar construction. Each fin 90, 92, 94 is formed from a soft plastic, and preferably black DELRIN™ material with a vertical thickness T between 1½ and 2½ inches. In one exemplary embodiment, the thickness T is equal to 2.562 inches.

The fin 90 projects in cantilever fashion from the front wall 70 of the frame/housing 12. The fin 90 projects forwardly a distance identified by X in FIG. 6 that, in a an exemplary form, is 2.969 inches. Preferably, projection of the fin is in the range of 1–4 inches, although it is believed that heat retention improves as the projection increases beyond 4 inches. The fin 90 is slotted to accept the uppermost flange 38 in such a manner that a rearwardly facing surface 96 on the fin 90 abuts facially to the front wall 70 of the frame/housing 12. The flange 38 acts as a reinforcement for the fin 90. The fins 92, 94 are attached at the front of the cabinet 10 in a like manner.

The fins 90, 92, 94 span the full width of the openings 72, 74. The fin 90 is situated vertically so that a flat, downwardly facing surface 98 thereon is substantially flush with the ceiling surface 46 bounding the subspace 48. The fin 92 has a flat, upwardly facing surface 100 which is flush with the surface 45 on the top shelf 28. With this arrangement, the surfaces 98, 100 serve as a guide to facilitate entry of the containers 102, 104 into the subspace 48.

To facilitate entry of the containers 102, 104 to between the fins 90, 92, the forward portions of the fins 90, 92 are bevelled. More particularly, a bevel 106 is formed at the juncture of the front surface 108 of the fin 90 and the downwardly facing surface 98 thereon. A similar bevel 110 is defined at the juncture of the front face 112 of the fin 92 and the upwardly facing surface 100 thereon. This bevelled arrangement accounts for an effectively vertically widened opening between the fins 90, 92 at the front thereof. The bevels 106, 110 also act as ramps to guide the containers 102, 104 into centered relationship between the fins 90, 92 and ultimately to between the surfaces 45, 46 bounding the subspace 48. The fin pairs 92, 94; 84, 86; and 86, 88 cooperate with their respective opening and function in the same manner as the fin pair 90, 92.

The fins 84, 86, 88, 90, 92, 94 can perform many different functions. Most significantly, the inventors herein have found that the fins 84, 86, 88, 90, 92, 94 effectively avoid heat convection between the subspaces 44, 48 and between each of the subspaces 44, 48 and the external atmosphere. Through extensive testing, it has been found that the described configuration for the fins 84, 86, 88, 90, 92, 94 maintains a desired temperature differential between the subspaces 44, 48 and effectively and efficiently maintains the desired food treatment temperature in the subspaces 44, 48, with conventional 250 watt silicone heaters. This is accomplished without any type of closure.

The fins 84, 86, 88, 90, 92, 94 also, by reason of being made of soft plastic, such as DELRIN™, and also by reason of being bevelled, provide surfaces that are comfortable to the user. That is, the user can direct his/her hand between the fins 84, 86, 88, 90, 92, 94 without encountering any sharp edges. Introduction and removal of the containers 102, 104 can be accomplished without fear of injury to the user.

Additionally, as described above, the fins 84, 86, 88, 90, 92, 94 conveniently guide the containers 102, 104 into the subspaces 44, 48. Ideally, the bevels on each of the fins 84, 86, 88, 90, 92, 94 is chosen to produce an effective vertical dimension that is on the order of ½ inch wider than the spacing between the surfaces 45, 46 and 40, 42, bounding the subspaces 48, 44, respectively.

Another significant feature of the invention is a specific cooperation between the containers 102, 104 and the frame/housing 12. The container 102 has a conventional construction. The frame/housing 12 can be dimensioned to accommodate the industry standard 12×20×2½ inch polysulphone steam table pan. This container 102 has a bottom wall 114 and a peripheral wall 116 extending upwardly therefrom and defining in conjunction with the bottom wall 114 a cup-shaped receptacle 118. The wall 116 terminates at an upper edge 120 that resides substantially within a plane. With the container 102 in an operative position, the container 102 resides substantially fully within the subspace 48 between the heated surfaces 45, 46. The plane of the surface 46 is substantially parallel to the plane defined by the container edge 120. In a preferred form, the spacing between the edge and the surface 46 is no more than 1 inch and more preferably on the order of ½ or 1/16 inch.

With this arrangement, heat applied to the bottom wall 114 of the container 102 and into the receptacle 118 from above creates an environment within the receptacle 118 dictated by the temperature and the moisture content of the food items 23 therein. Consequently, one environment can be maintained in the container 102 in the subspace 48, with a separate environment being maintained in the subspace 44 therebelow by keeping the two subspaces 44, 48 at a different temperature.

By withdrawing the container 102, the receptacle 118 is exposed to the atmosphere. This causes the environment within the receptacle 118 to be instantaneously changed. After the container 102 is reinserted, the environment must be reestablished with the fewer food items 23 therein. Inconsistent quality for the food items 23 may result from one serving to the next.

To avoid this problem, the invention contemplates use of the container 104 having separate compartments 122, 124, 126. The compartments 122, 124, 126 extend laterally so that withdrawal of the container 104 can expose one of the compartments 122, 124, 126 to the atmosphere to allow access to the contents thereof, without exposing the remaining compartments 122, 124, 126. Accordingly, food items 23 can be withdrawn without disturbing the environment for articles in all of the other compartments 122, 124, 126.

The provision of front and rear openings 72, 74, 80, 82 facilitates introduction and removal of the containers 102, 104. For example, the containers 102, 104 can be serially loaded by a cook from one of the front and rear openings, with a server withdrawing the containers 102, 104 one by one from the other of the front and rear openings of the cabinet 10.

The foregoing disclosure of specific embodiments is intended to be illustrative of the broad concepts comprehended by the invention.

We claim:

1. A food treatment cabinet comprising:
   a frame/housing defining a food treatment space;
   first means for at least one of heating, cooling, and adding moisture to air within the food treatment space,
   said frame/housing having a first wall with a first opening therethrough to selectively permit introduction of food into the food treatment space and withdrawal of food from the food treatment space; and
   a first fin projecting away from the first wall above at least part of the first opening to inhibit heat transfer between the food treatment space and the atmosphere externally of the food treatment space.

2. The food treatment cabinet according to claim 1 wherein the first fin projects away from the first frame/housing wall between 1–4 inches.

3. The food treatment cabinet according to claim 1 wherein the first frame/housing opening has a width and the first fin extends across substantially the entire width of the first frame/housing opening.

4. The food treatment cabinet according to claim 1 wherein there is no cover on the frame/housing that blocks the first frame/housing opening so that the first frame/housing opening at all times defines an unobstructed path to the food treatment space.

5. The food treatment cabinet according to claim 1 wherein the first fin comprises a plastic material.

6. The food treatment cabinet according to claim 1 wherein the frame/housing defines a first downwardly facing surface and a second upwardly facing surface bounding a first subspace within the food treatment space and the first means comprises means for at least one of heating and cooling each of the first and second surfaces.

7. The food treatment cabinet according to claim 6 in combination with a container for food, the container being repositionable relative to the frame/housing selectively between a first position wherein food in the container is situated in the food treatment space between the first and second surfaces and a second position wherein the container is situated so that food can be placed in and removed from the container without interference from the first and second surfaces.

8. The food treatment cabinet according to claim 7 wherein the container has a bottom wall and a peripheral wall extending upwardly from the bottom wall, terminating at an upper edge, and defining in conjunction with the bottom wall a cup-shaped configuration, and the first surface on the housing/frame resides no more than one inch above the upper edge of the peripheral wall of the container with the container in the first position.

9. The food treatment cabinet according to claim 8 wherein the upper edge of the container resides substantially in a plane, the first surface on the frame/housing is substantially planar and the plane of the first surface of the frame/housing is substantially parallel to the plane of the upper edge of the container with the container in the first position.

10. The food treatment cabinet according to claim 9 wherein the upper edge of the container is spaced no more than ½ inch from the first surface of the frame/housing with the container in the first position.

11. The food treatment cabinet according to claim 9 wherein the upper edge of the container is spaced on the order of 1/16 inch from the first surface of the frame/housing with the container in the first position.

12. The food treatment cabinet according to claim 6 wherein the frame/housing defines a third downwardly facing surface and a fourth upwardly facing surface bounding a second subspace within the food treatment space and the first means comprises means for at least one of heating and cooling each of the third and fourth surfaces.

13. The food treatment cabinet according to claim 12 wherein the first and second subspaces are spaced vertically from each other, there is a second opening in the frame/housing wall through which access can be gained to the second subspace, and there is a second fin projecting away from the wall above at least a part of the second opening.

14. The food treatment cabinet according to claim 13 wherein the first opening resides at least partially between the first and second fins and at least one of the first and second fins has a surface for guiding a container into the first position.

15. The food treatment cabinet according to claim 14 wherein the guiding surface on the at least one of the first and second fins is at approximately the same height as the second frame/housing surface.

16. The food treatment cabinet according to claim 13 wherein at least one of the first and second fins has a ramp portion that guides a container into the first subspace.

17. The food treatment cabinet according to claim 1 wherein the frame/housing has a second wall with a second opening therethrough so that an uninterrupted passage is defined from the first opening through the food treatment space and out the second opening.

18. The food treatment cabinet according to claim 1 wherein the fin has a thickness in a vertical direction between 1½–2½ inches.

19. The food treatment cabinet according to claim 11 wherein the container has a plurality of compartments therein and with the container in the second position one of the plurality of compartments resides between the first and second frame/housing surfaces and another of the plurality of compartments does not reside between the first and second frame/housing surfaces.

20. The food treatment cabinet according to claim 17 wherein there is a second fin projecting away from the second wall above at least a part of the second opening.

* * * * *